United States Patent
Tsai

(10) Patent No.: US 8,368,967 B2
(45) Date of Patent: Feb. 5, 2013

(54) SCANNING CONTROLLER, SCANNING APPARATUS AND METHOD FOR PERFORMING THE SCANNING CONTROLLER

(75) Inventor: Mi-lai Tsai, Keelung (TW)

(73) Assignee: Genesys Logic, Inc., Shindian (TW)

( * ) Notice: Subject to any disclaimer, the term of this patent is extended or adjusted under 35 U.S.C. 154(b) by 642 days.

(21) Appl. No.: 12/567,113

(22) Filed: Sep. 25, 2009

(65) Prior Publication Data

US 2010/0214628 A1   Aug. 26, 2010

(30) Foreign Application Priority Data

Feb. 26, 2009   (TW) .............................. 98106257 A

(51) Int. Cl.
*H04N 1/04* (2006.01)
(52) U.S. Cl. ......... 358/412; 358/404; 358/444; 358/474
(58) Field of Classification Search .................. 358/412, 358/404, 444, 474, 483, 471
See application file for complete search history.

(56) References Cited

U.S. PATENT DOCUMENTS

| 6,160,636 | A * | 12/2000 | Nagano et al. ................. 358/412 |
| 7,984,209 | B1 * | 7/2011 | Chan et al. ........................ 710/52 |
| 2007/0070435 | A1 * | 3/2007 | Wang ........................ 358/426.03 |

FOREIGN PATENT DOCUMENTS

JP          2717282        4/1990

* cited by examiner

*Primary Examiner* — Houshang Safaipour

(57) ABSTRACT

A scanning controller, a scanning apparatus and a method for performing the scanning controller are disclosed herein. The scanning controller includes an image data processing unit, a memory control unit, a dummy line control unit, a buffer condition control unit, a motor condition control unit, a motor controlling unit and a relation control unit. Based on at least one of several predetermined contrastive relationships among each stored data amount with regard to an image buffer and its corresponding motor move timing, the relation control unit controls generation of a motor move timing from the motor controlling unit to drive a motor with variance of a scanned data generation rate and simultaneously enable determination of the dummy line control unit on which part of scanned image data should be skipped by catching of the image data processing unit.

10 Claims, 5 Drawing Sheets

SCANNING CONTROLLER, SCANNING APPARATUS AND METHOD FOR PERFORMING THE SCANNING CONTROLLER

BACKGROUND OF THE INVENTION

1. Claim of Priority

This application claims priority to Taiwanese Patent Application No. 098106257 filed on Feb. 26, 2009.

2. Field of the Invention

The present invention relates to a scanning controller, a scanning apparatus and a method for performing the scanning controller, and more particularly, to a scanning controller for diminishing incompletion or discreteness of scanned data.

3. Description of the Prior Art

During a single side or double side scanning process performed by typical image scanner, it usually occurs that an image buffer of the scanner overflows with or is full of catching an overlarge image data amount if the typical image scanner adopts a multiple-page or a high-resolution scanning mode. As long as available capacity of the image buffer is insufficient to continue store following-scanned image data thereon, the scanning-document process of the image scanner would be interrupted. For example, an image sensor of the image scanner such as a charge coupled device (CCD) or a contact image sensor (CIS) is stopped to scanning, and a stepping motor is stopped to drive a transmission mechanism of the image scanner.

In an exemplar that a scanning-document process as showing in FIG. 1 is performed by the typical image scanner and includes the following steps of:

step S100, scanning at least one page of a document;

step S110, determining whether the image buffer is full of data or not, wherein if not yet, performing a step S120, and otherwise if so, performing a step S130;

step S120, continuing to scan this page;

step S130, stopping scanning of an image sensor of the image scanner and stopping driving movement of a stepping motor, and then performing a step S132;

step S132, determining whether the image buffer is full of data or not, wherein if not yet, performing a step S134, and otherwise if so, performing the step S130;

step S134, reactivating scanning and driving the stepping motor;

step S140, determining whether the scan to this page is finished or not, wherein if so, performing a step S150, and otherwise if not, returning to the step S110 so as to determining whether the image buffer is full of data or not; and step S150, determining whether the scans to all of the pages of the document are finished or not, wherein if so, ending this process, and otherwise if not, returning to the step S100 so as to scan the next page.

On the above-mentioned step S130, although the image sensor of the image scanner is controlled to stop scanning and to stop driving movement of the stepping motor, the fact is that the inertia still carries the stepping motor and its transmission mechanism under a high-speed (e.g. in a full step) running to gradually decelerate for a while until completely stop, rather than instantly stop. Briefly, during such a decelerated period, the stepping motor and its transmission mechanism still move to a wrong position in excess of where the stepping motor and its transmission mechanism are supposed to stop with regard to the scanned document. The image data on the excess can not be catch by the image sensor. Afterward, when the image data amount stored within the image buffer falls down, the stepping motor and its transmission mechanism are reactivated to move from the wrong position for scanning. It would invoke incompletion or discreteness of some image data scanned during the scanning-document process as a data loss problem. To resolve such a problem, an approach is to enlarge image buffer capacity with a higher element expense but could not bring an economic benefit.

BRIEF SUMMARY OF THE INVENTION

To resolve the abovementioned drawbacks, a primary object of the present invention is to provide a scanning controller, a scanning apparatus and a method for performing the scanning controller, which are capable of diminishing the scanning-interrupted problem caused from data fullness of the image buffer.

Besides, an another object of the present invention is to provide a scanning controller, a scanning apparatus and a method for performing the scanning controller, which are capable of preventing the scanning interruption with data fullness of the image buffer from invoking incompletion or discreteness of scanned image data.

To accomplish the above invention object, the present invention discloses a scanning apparatus applied for a document/an image scanner, which principally includes an image sensor, an analog front end (AFE) unit, a scanning controller, an image buffer, at least one motor driving unit and at least one motor. The image sensor can sense analog image signal from at least one page of a document. The AFE unit connected with the image sensor is used for analog-to-digital image signal conversion.

The scanning controller includes an image data processing unit, a memory control unit, a dummy line control unit, a buffer condition control unit, a motor condition control unit, a motor controlling unit and a relation control unit, wherein the image data processing unit processes the digital image signal from the AFE unit and accordingly generates image data to be stored within the image buffer. The motor controlling unit can generate at least one motor driving timing for driving a corresponding motor. The relation control unit can control generation of the at least one motor driving timing from the motor controlling unit, based on at least one of predetermined contrastive relationships among each stored data amount of the image buffer and its corresponding motor move timing. The dummy line control unit can determine which part of scanned image data is non-catch for the image data processing unit, based on both an inspected actual data amount stored within the image buffer and the contrastive relationship determined by the relation control unit, wherein the non-catch scanned image data defines that a specific scanned image data should be skipped by catching of the image data processing unit and does not need to proceed.

Besides the present invention also provides a method for performing a scanning controller, comprises the following steps of:

providing a motor driving timing to drive at least one motor on movement of an image scanning mechanism and scanning at least one page of a document to generate an image data therefrom;

storing the image data within an image buffer;

periodically inspecting an actual data amount stored within the image buffer;

based on at least one of predetermined contrastive relationships among each stored data amount with regard to the image buffer and its corresponding motor move timing, utilizing an inspected actual data amount stored within the image buffer to determine a proper motor driving timing which can increase or decrease a rate of generating image data, wherein the predetermined contrastive relationships includes at least one storage threshold or a first and second storage thresholds;

simultaneously based on both the inspected actual data amount stored within the image buffer and the determined contrastive relationship, determining whether the inspected actual data amount stored within the image buffer exceeds the first storage threshold or not;

if the inspected actual data amount stored within the image buffer exceeds the first storage threshold, varying the at least one motor driving timing to decelerate the motor and thereby decreasing the image data generating rate and simultaneously increasing a dummy line amount appearing in the image data; and if the inspected actual data amount stored within the image buffer is lower than the second storage threshold, varying the at least one motor driving timing to accelerate the motor and thereby increasing the image data generating rate and simultaneously decreasing a dummy line amount appearing in the image data.

The advantages and novel features of the invention will become more apparent from the following detailed description of a preferred embodiment when taken in conjunction with the accompanying drawings.

BRIEF DESCRIPTION OF THE DRAWINGS

The present invention may best be understood through the following description with reference to the accompanying drawings, in which:

FIG. 4A depicts a timing diagram of several timings employed by the scanning apparatus under a normal operation mode, according to a first preferred embodiment of the present invention, which includes a full-step motor timing, a trigger timing and a scanned data generating timing;

FIG. 4B depicts a timing diagram of several timings employed by the scanning apparatus with a data-generating control mode, according to the first preferred embodiment of the present invention, which includes a half-step motor timing, a trigger timing and a scanned data generating timing;

FIG. 4C depicts a timing diagram of several timings employed by a scanning apparatus with another data-generating control mode, according to a second preferred embodiment of the present invention, which includes a decelerated full-step motor timing, a trigger timing and two selectable different scanned data generating timings; and.

DETAILED DESCRIPTION OF THE INVENTION

Figure 1:
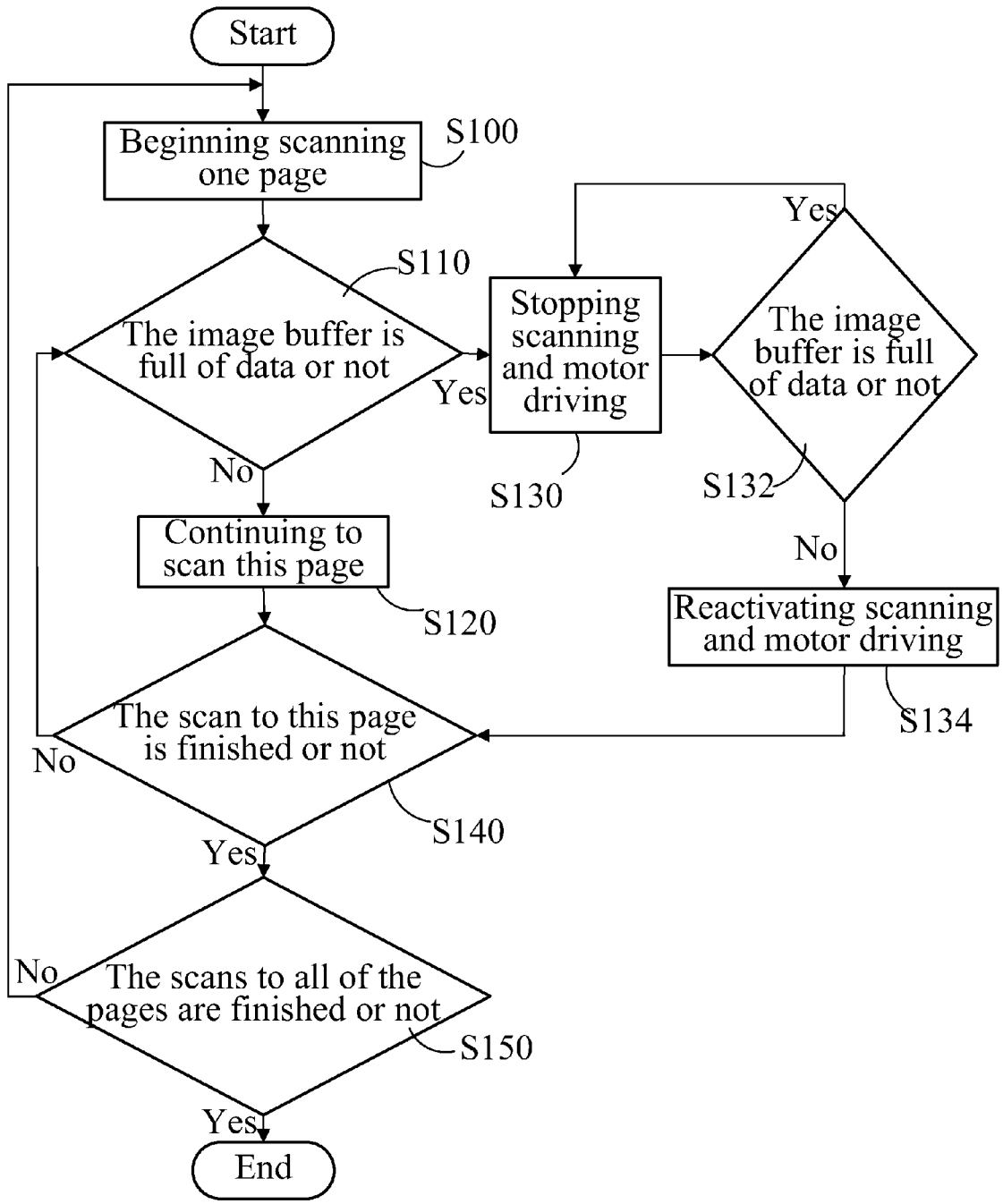
FIG. 1 illustrates a method flowchart of using the prior image scanner.
Figure 2:
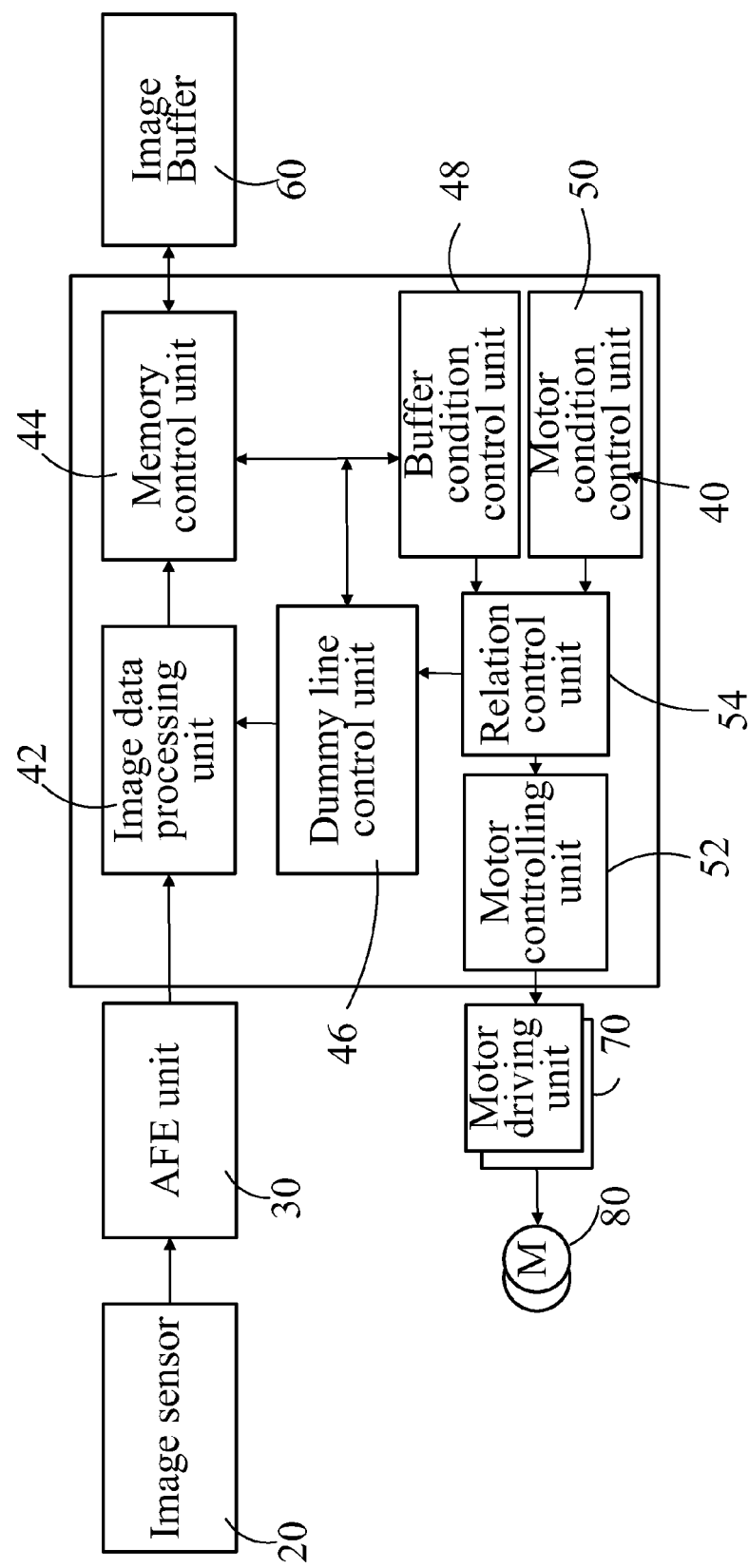
FIG. 2 illustrates an architectural block diagram of a scanning apparatus according to a first preferred embodiment of the present invention.

Firstly referring to illustration of FIG. 2, a scanning apparatus applied for a document/an image scanner, according to a first preferred embodiment of the present invention, which principally includes an image sensor 20, an analog front end (AFE) unit 39, a scanning controller 40, an image buffer 60, at least one motor driving unit 70 and at least one motor 80, wherein the at least one motor driving unit 70 may be implemented as a high-power motor driving controller which employs a motor driving timing for driving a corresponding motor 80. In this embodiment, the motor 80 can be implemented as a stepping motor to drive a corresponding image scanning mechanism including, for example, either a transmission sending at least one page of a document and/or the image sensor 20. It notes that application of either the scanning controller 40 or scanning apparatus according to the present invention is not limited for a scanner but for a copy machine, a facsimile machine, a print machine, a multi-function peripheral (MFP) or any other device which needs a scanning function.

The image sensor 20 such as a charge coupled device (CCD) or a contact image sensor (CIS) can sense an analog image signal from the at least one page document. The AFE unit 30 connected with the image sensor 20 is used for performing a signal conversion from an analog image signal sensed by the image sensor 20 to a digital image signal.

The scanning controller 40 such as an ASIC-based integrated controlling chip includes an image data processing unit 42, a memory control unit 44, a dummy line control unit 46, a buffer condition control unit 48, a motor condition control unit 50, a motor controlling unit 52 and a relation control unit 54.

The image data processing unit 42 is utilized to process the digital image signal transmitted from the AFE unit 30 and accordingly generate an image data. The memory control unit 44 connected with the image data processing unit 42 manages data access (including the image data access) from/to the image buffer 60, for example, storing the image data from the image data processing unit 42 into the image buffer 60. The image buffer 60 can be designedly disposed out of/within the scanning controller 40.

The buffer condition control unit 48 connected with the memory control unit 44 is utilized to periodically inspect an actual data amount stored within the image buffer 60 to provide both the relation control unit 54 and the dummy line control unit 46 with each-time inspected actual data amount stored within the image buffer 60 or one of different storage condition messages representing various actual data amounts. These different storage condition messages includes, for example, 'storage full', 'full approach', 'empty', 'empty approach', 'sufficient capacity', 'very sufficient capacity' and so on.

The motor condition control unit 50 is utilized to determine a proper motor driving timing type provided for the relation control unit 54, wherein the proper motor driving timing type includes, for example, an integral step motor timing, a non-integral step motor timing or a motor trigger speed. The integral step motor timing defines that the driving timing of the motor 80 is an integral step, like a full step. The non-integral step motor timing defines that the driving timing of the motor 80 is a fractional step for finely tuning, like a ½ step (e.g. half step), ¼ step, ⅛ step and so on.

The relation control unit 54 can refer to the actual stored data amount inspected by the buffer condition control unit 48 or different storage condition message to determine or set which one proper motor driving timing is outputted from the motor controlling unit 52, based on at least one of several built-in or additional predetermined contrastive relationships among each stored data amount of the image buffer and its corresponding motor move timing. For example, the predetermined contrastive relationships can define a top-level storage threshold representing that the capacity of the image buffer 60 approaches a data-full condition, a bottom-level storage threshold representing that the capacity of the image buffer 60 approaches empty, and other different-level storage thresholds representing different storage conditions. As long as determining that the actual stored data amount or various storage condition message is approaching or exceeding the top-level storage threshold, the relation control unit 54 begins to continuously slow down the motor driving timing of the motor controlling unit 52 so that the motor 80 can be continuously decelerated to decrease a scanned data generating rate and thereby reduce a possibility that the image buffer 60 is full of the image data. The manner of slowing down the motor driving timing is to make a timing variance, for example, from a full step to a half step, from a half step to a ¼ step or from a full step to a ¼ step, directly. On the other respect, as long as inspecting that the actual stored data amount or various storage condition message is approaching or lower than the bottom-level storage threshold, the relation control unit 54 begins to continuously speed up the motor driving timing of the motor controlling unit 52 so that the motor 80 can be continuously accelerated to increase the scanned data generating rate. The manner of speeding up the motor driving timing is to make a timing variance, for example, from a half step to a full step, from a ¼ step to a half step or from a ¼ step to a full step, directly. Thus, a usability performance of the image buffer 60 can be greatly raised according to the present invention.

Figure 3:
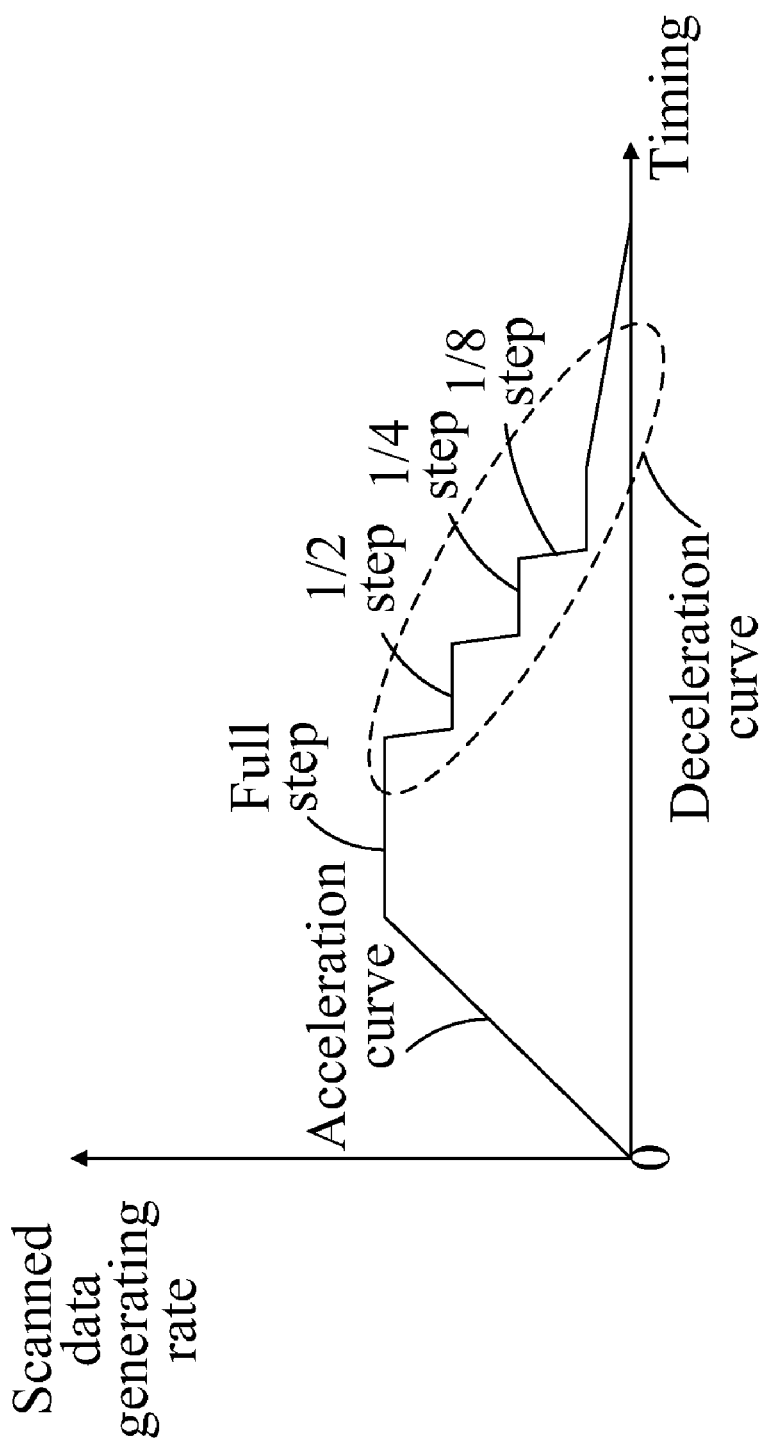
FIG. 3 depicts a coordinate diagram of contrastive relationships among scanned data generating rates and motor driving timings.

In an exemplar as illustrated in FIG. 3, a coordinate diagram of contrastive relationships among scanned data generating rates and motor driving timings is introduced, which depicts a deceleration curve representing that the relation control unit 54 continuously slows down the motor driving timing with different timing variances output from the motor controlling unit 52 so as to decelerate the motor 80. The different timing variances includes three successive stages, the first of which is performed from a full step to a half step, the second of which is performed from the half step to a ¼ step, and the third of which is performed from the ¼ step to a ⅛ step. During the timing variances period, the scanned data generating rate can be continuously decreased to reduce the possibility that the image buffer 60 is full of the image data. Even though it unavoidably happens that the image buffer 60 is ultimately full of the larger image data to invoke a scanning interruption, the continuous deceleration of the motor 80 can efficiently diminish the excess of where the motor 80 and its transmission mechanism should stop moving, with the inertia involvement. In comparison with the prior art, the present invention can ensure integrality and continuity of scanned data during the whole scanning process. It is noted that the buffer condition control unit 48, the motor condition control unit 50 and the relation control unit 54 can be implemented but not limited by at least one/a combination of a comparative logic, an operation logic, a control logic and/or a look-up table.

Returning to FIG. 2, when the relation control unit 54 controls variable generation of the motor driving timing from the motor controlling unit 52, the relation control unit 54 also provides the dummy line control unit 46 with a result message of determining the corresponding contrastive relationship. The dummy line control unit 46 can control the image data processing unit 42 processing the scanned image data to determine which part of the scanned image data is non-catch for the image data processing unit 42, based on both the actual stored data amount or storage condition message regarding to the image buffer 60 and the corresponding contrastive relationship provided by the relation control unit 64. The non-catch scanned image data defines that a specific scanned image data should be skipped by catching of the image data processing unit 42 and does not need to proceed, but is revealed in dummy line form which does not need additionally generated. Commonly, the prior scanning apparatus scans data line by line so as to catch corresponding image data, wherein if there is any one data line absented during the scanning process, the absence of the data line is as a dummy line inherently appearing. Differently from the prior art, during a scanning process according to the present invention, although the image sensor 20 senses complete image data from the document, the dummy line control unit 46 generates a control signal to the image data processing unit 42 processing the scanned image data to determine which part of the scanned image data is non-catch for the image data processing unit 42, based on both the actual stored data amount or storage condition message regarding to the image buffer 60 and the corresponding contrastive relationship. The non-catch part of the scanned image data is skipped without data processing of the image data processing unit 42 but appears as dummy line form which does not need additionally generated, except that the other catch part of scanned image data is normally processed by the image data processing unit 42. Since the dummy line is not considered as a real image data to save into the image buffer 60 but only the catch part of image data is considered as a real image data to save into the image buffer 60 during data processing, the scanned data generating rate can be lowered to bring a lower data storage rate of the image buffer 60. The possibility that the image buffer 60 is full of image data can be therefore reduced. In this embodiment, when the relation control unit 54 determines that the actual stored data amount inspected or storage condition message exceeds the predetermined top-level storage threshold, apart from slowing down the motor driving timing to continuously decelerate the motor 80, the relation control unit 54 enables determination of the dummy line control unit 46 on relatively increasing dummy line amounts appearing in the image data processed by the image data processing unit 42. On the other respect, when the relation control unit 54 determines that the actual stored data amount inspected or storage condition message is lower than the predetermined bottom-level storage threshold, apart from speeding up the motor driving timing to continuously accelerate the motor 80, the relation control unit 54 enables determination of the dummy line control unit 46 on relatively decreasing dummy line amount appearing in the image data processed by the image data processing unit 42.

Figure 4:
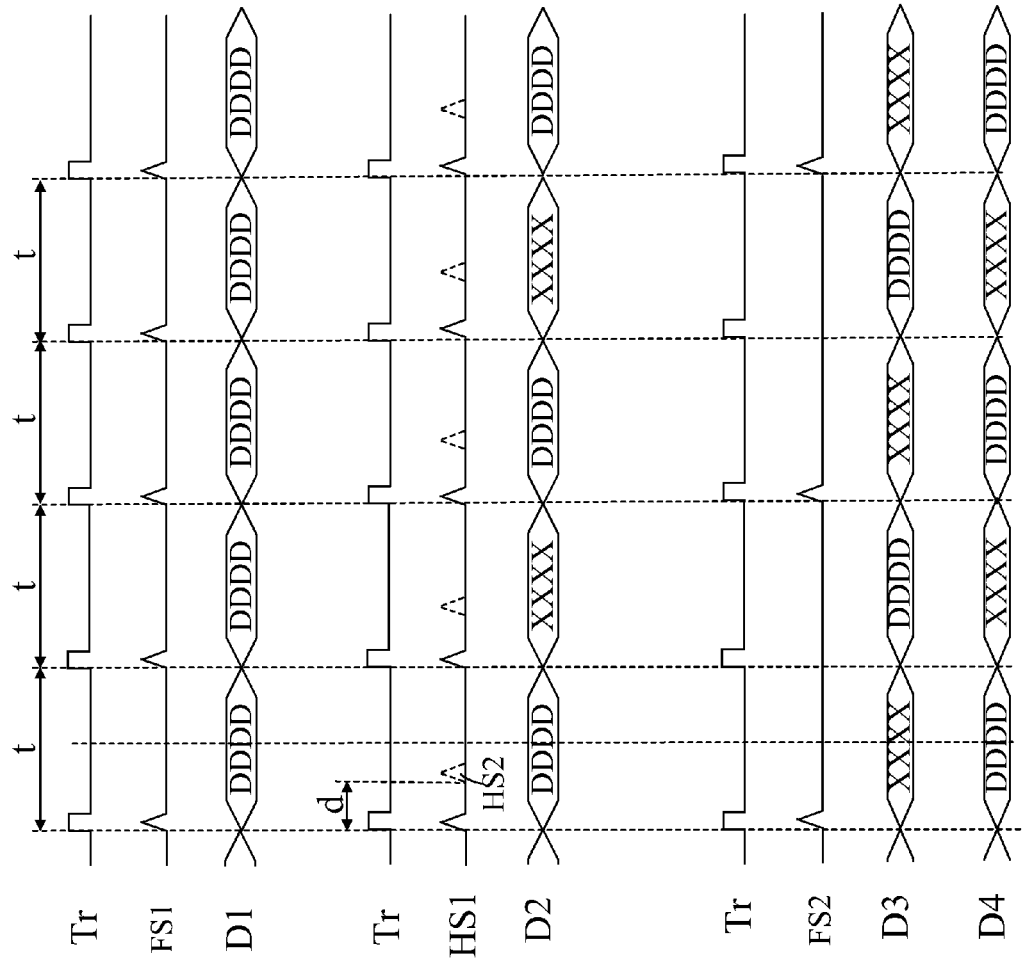

For example, FIGS. 4A-AC depict different timing diagrams of the scanning apparatus under different operation modes, according to the present invention, which introduces the relationships established among the motor driving timings and different dummy line amounts. FIG. 4A depict a timing diagram of several timings employed by the scanning apparatus shown in FIG. 2 under a normal operation mode, according to the first preferred embodiment of the present invention, which includes a trigger timing (Tr) of the image sensor 20, a full-step motor timing (FS1) and a scanned data generating timing (D1) of the image data processing unit 42 for generating the image data. When the image buffer 60 is inspected on a sufficient available capacity as performing the normal operation mode by the apparatus, the trigger timing (Tr), the full-step motor timing (FS1) and the scanned data generating timing (D1) all are synchronous with regard to each other during each duty cycle (t) such as '1 ms'. During each duty cycle (t), a series of scanned image data "DDDD" (e.g. a scanned line) is generated by moving of the motor 80 in a full-step timing, wherein each letter "D" of the scanned image data "DDDD" appears as representing each image data catch by the image data processing unit 42. Under the normal operation, a longer series of scanned image data "DDDDDDDD" is generated if during each two times of the duty cycle (2×t) as '2 ms'.

FIG. 4B depicts another timing diagram of several timings employed by the scanning apparatus wherein the image buffer 60 is inspected on an insufficient available capacity, a data-generating control mode is actively performed by the apparatus, which includes a step of slowing down the motor driving timing from a full step (FS1) to a half-step (HS1) per each duty cycle (t), except that the trigger timing (Tr) and the scanned data generating timing (D2) retain unchanged at '1 ms'. Under the data-generating control mode, a longer series of scanned image data "DDDDXXXX" is generated if during each two-time duty cycle (2×t), one part of which is as "DDDD" and the other part of which is as "XXXX" but revealed in dummy lines if determined by the dummy line unit 46 as non-catch by the image data processing unit 42. Although the longer series of scanned image data "DDDDXXXX" is generated during each two-time duty cycles (2×t), the non-catch part of scanned image data "XXXX" as revealed in dummy lines is not considered as a real image data to save into the image buffer 60, except that only the catch part of scanned image data "DDDD" is considered as a real image data to save into the image buffer 60. In comparison with the operation mode shown in FIG. 4A during the same two-time duty cycle (2×t), the data-generating control mode shown in FIG. 4B only outputs the scanned image data "DDDD" with a length lesser than length of the scanned image data "DDDDDDDD" output from the operation mode shown in FIG. 4A, and therefore can lower the image data generating rate. In other embodiments, if the motor 80 employs other lower motor driving timings such as a ¼ or ⅛ step, the data storage rate of the image buffer 60 can be lowered greatly to prevent the image buffer 60 from being full of image data, rapidly and unaware. In other embodiment, the scanning apparatus can also employ other motor driving timings (HS2) which retains a fixed distance difference (d) from the trigger timing (Tr). For example, the distance difference (d) can be designated to be smaller than a duty cycle (t) of the trigger timing (Tr).

FIG. 4C depicts a timing diagram of several timings employed by a scanning apparatus according to a second preferred embodiment of the present invention, wherein the image buffer 60 is inspected on an insufficient available capacity, another data-generating control mode is actively performed by the apparatus, which includes a step of slowing down the motor driving timing in a full-step (HS1) per each two-time duty cycle (2×t) as '2 ms', except that the trigger timing (Tr) and the scanned data generating timing (D3) or (D4) retain unchanged at '1 ms'. Since the motor driving timing is set to a full step (HS1) per each two-time duty cycle (2×t), only a part of the scanned image data "DDDD" is catch but the other part of the scanned image data "XXXX" is non-catch by the image data processing unit 42 and appears in dummy line. Additionally, by determination of the dummy line control unit 46 with variance of the scanned data generating timing (D3) or (D4), a front half or rear half of the scanned image data as "XXXX" can be selectively non-catch and appears in dummy line as the same function as the first embodiment.

As shown in FIG. 2, the motor controlling unit 52 is utilized to generate different motor driving timing to the motor driving unit 70 for driving moving speed of at least one corresponding motor 80 with it image scanning mechanism, based on a result message of determining the corresponding contrastive relationship transmitted from the relation control unit 54. In motor control, the motor driving timing can be employed in an integral-step (e.g. a full step), a non-integral step (e.g. a ½, ¼, ⅛ step), a motor trigger speed or other motor driving timings of various presently-used stepping motors.

Figure 5:
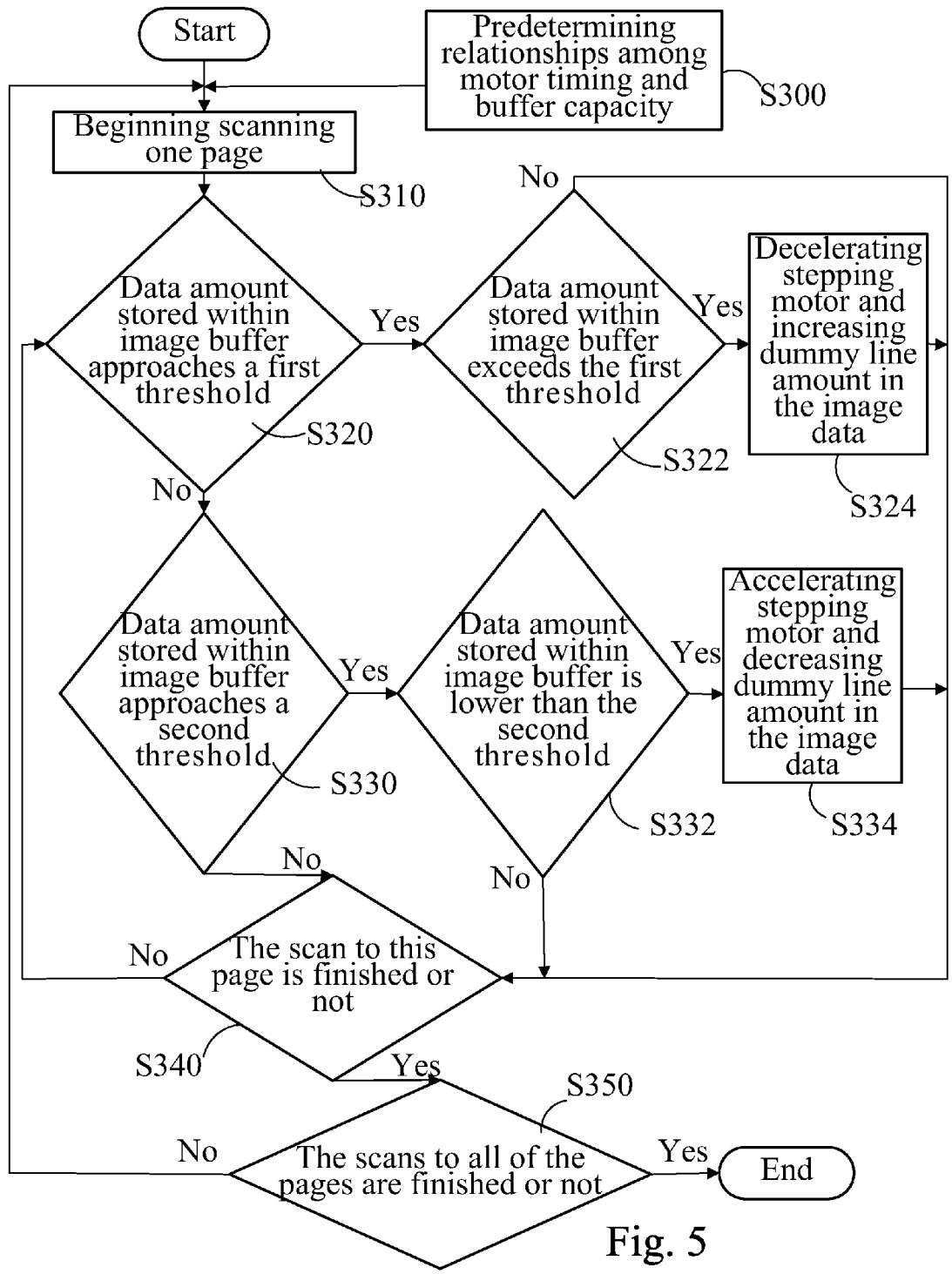
FIG. 5 illustrates a method flowchart for perform a scanning controller according to the present invention.

Besides, FIG. 5 introduces a method for performing a scanning controller, according to the present invention, with reference to elements shown in FIG. 2, comprises:

step S300, predetermining multiple contrastive relationships among various stored data amounts of the image buffer and their corresponding motor move timings, wherein the predetermined contrastive relationships include at least one storage threshold or a first and second storage thresholds (like a top-level and bottom-level storage thresholds);

step S310, providing at least one of the motor driving timings to drive at least one motor on movement of an image scanning mechanism including, for example, an image scanner or a transmission mechanism for scanning at least one page of a document to generate image data therefrom; and then storing the image data within an image buffer;

step S320, periodically inspecting an actual data amount stored within the image buffer, and determining whether the actual stored data amount approaches a first storage threshold defined within the predetermined contrastive relationships or not, wherein if not yet, processing a step S330, and otherwise if so, processing a step S322;

step S322, periodically inspecting the actual data amount stored within the image buffer, and determining whether the actual stored data amount exceeds the first storage threshold defined or not, wherein if not yet, processing a step S340, and otherwise if so, processing a step S324;

step S324, utilizing the inspected actual data amount stored within the image buffer to determine a variable corresponding motor driving timing to decelerate the motor and thereby decrease an image data generating rate, and simultaneously increase dummy line amount appearing in the image data, and afterward processing the step S340;

step S330, periodically inspecting the actual data amount stored within the image buffer, determining whether the inspected data amount stored within the image buffer approaches a second storage threshold defined within the predetermined contrastive relationships or not, wherein if not yet, processing the step S340, and otherwise if so, processing a step S332;

step S332, periodically inspecting the actual data amount stored within the image buffer, determining whether the inspected actual data amount stored within the image buffer is lower than the second storage threshold or not, wherein if not yet, processing the step S340, and otherwise if so, processing a step S334;

step S334, utilizing the inspected actual data amount stored within the image buffer to determine a variable corresponding motor driving timing to accelerate the motor and thereby increase the image data generating rate, and simultaneously decrease dummy line amount appearing in the image data, and afterward processing the step S340;

step S340, determining whether the scan to this page is finished or not, wherein if so, processing a step S350, and otherwise if not yet, returning to the step S320 so as to determining whether the image buffer is full of data or not; and step S350, determining whether the scans to all of the pages of the document are finished or not, wherein if so, ending this process, and otherwise if not, returning to the step S310 so as to scan the next page.

In conclusion, the scanning controller, the scanning apparatus and the method for performing the scanning controller, according to the present invention, which are capable of diminishing the scanning-interrupted problem caused from data fullness of the image buffer as occurring in the prior art. Besides, the present invention can also prevent a scanning interruption with data fullness of the image buffer from invoking incompletion or discreteness of scanned image data.

It is to be understood, however, that even though numerous characteristics and advantages of the present invention have been set fourth in the foregoing description, together with details of the structure and function of the invention, the disclosure is illustrative only, and changes may be made in detail within the principles of the invention to the full extent indicated by the broad general meaning of the terms in which the appended claims are expressed.

What is claimed is:

1. A scanning controller for a scanner which comprises at least one image sensor, an analog front end unit used for performing a signal conversion from an analog image signal sensed by the at least one image sensor to a digital image signal, at least one motor and an image buffer, and the scanning controller comprising:
    an image data processing unit used to process the digital image signal from the analog front end unit and accordingly generate an image data to be stored within the image buffer;
    a memory control unit, connected with the image data processing unit and used to manage access of the image data from/to the image buffer;
    a buffer condition control unit, connected with the memory control unit to periodically inspect the actual data amount stored within the image buffer,
    a motor controlling unit used to generate at least one motor driving timing for driving the at least one motor;
    a relation control unit, utilizing the inspected actual data amount which is stored within the image buffer and is provided by the buffer condition control unit, to correspondingly determine the at least one motor driving timing from the motor controlling unit, based on at least one predetermined contrastive relationship between each stored data amount with regard to the image buffer and a corresponding motor move timing, wherein the at least one predetermined contrastive relationship includes at least one of a first and second storage thresholds;
    a motor condition control unit, used to determine and provide a proper motor driving timing type for the relation control unit; and
    a dummy line control unit determining an amount of dummy line appearing in the image data generated by the image data processing unit, based on the at least one predetermined contrastive relationship and the inspected actual data amount, wherein the inspected actual data amount is stored within the image buffer and is provided by the buffer condition control unit.

2. The scanning apparatus as claimed in claim 1, wherein the corresponding motor driving timing with regard to the at least one predetermined contrastive relationship includes a non-integral step or a motor trigger speed.

3. The scanning controller as claimed in claim 1, wherein each of the buffer condition control unit, the motor condition control unit and the relation control unit is implemented by at least one of a comparative logic, an operation logic, a control logic and/or a look-up table.

4. A scanning apparatus comprising:
    an image sensor for sensing an analog image signal from a document, wherein the image sensor is at least one of a charge coupled device (CCD) and a contact image sensor (CIS);
    an analog front end unit for converting the analog image signal into a digital image signal;
    at least one motor for moving a scanning mechanism;
    an image data processing unit for processing the digital image signal from the analog front end unit and accordingly generates an image data;
    an image buffer for storing the image data;
    a memory control unit, connected with the image data processing unit and used to manage access of the image data from/to the image buffer;
    a buffer condition control unit, connected with the memory control unit to periodically inspect the actual data amount stored within the image buffer;
    a motor controlling unit for generating at least one motor driving timing for driving the at least one motor;
    a relation control unit for utilizing the inspected actual data amount which is stored within the image buffer and is provided by the buffer condition control unit to correspondingly determine the at least one motor driving timing from the motor controlling unit, based on at least one predetermined contrastive relationship between each stored data amount with regard to the image buffer and a corresponding motor move timing, wherein the at least one predetermined contrastive relationship includes at least one of a first and second storage thresholds;
    a motor condition control unit, used to determine and provide a proper motor driving timing type for the relation control unit; and
    a dummy line control unit for determining an amount of dummy line appearing in the image data generated by the image data processing unit, based on the at least one predetermined contrastive relationship and the inspected actual data amount, wherein the inspected actual data amount is stored within the image buffer and is provided by the buffer condition control unit.

5. The scanning apparatus as claimed in claim 4, wherein the corresponding motor driving timing with regard to the at least one predetermined contrastive relationship includes a non-integral step or a motor trigger speed.

6. The scanning apparatus as claimed in claim 4, wherein each of the buffer condition control unit, the motor condition control unit and the relation control unit is implemented by at least one of a comparative logic, an operation logic, a control logic and/or a look-up table.

7. The scanning apparatus as claimed in claim 4, further comprising: at least one motor driving unit for driving the at least one motor based on the at least one motor driving timing generated from the motor controlling unit.

8. A method for performing a scanning controller, comprises the following steps of:
    providing a motor driving timing to drive at least one motor on movement of an image scanning mechanism or an image sensor and thereby scanning at least one page of a document to generate image data;
    storing the image data within an image buffer;
    periodically inspecting an actual data amount stored within the image buffer;
    based on at least one predetermined contrastive relationship between each stored data amount with regard to the image buffer and a corresponding motor move timing, utilizing the inspected actual data amount stored within the image buffer to determine at least one motor driving timing which changes a rate of generating the image data; and
    simultaneously based on the inspected actual data amount stored within image buffer and the at least one predetermined contrastive relationship, determining an amount of dummy line appearing in the image data.

9. The scanning apparatus as claimed in claim 8, wherein the at least one predetermined contrastive relationship includes at least one of a first and second storage thresholds.

10. The method as claimed in claim 9, further comprising the following steps of:
   determining whether the inspected actual data amount stored within the image buffer exceeds the first storage threshold or not;
   if the inspected actual data amount stored within the image buffer exceeds the first storage threshold, varying the at least one motor driving timing to decrease the image data generating rate and to simultaneously increase a dummy line amount appearing in the image data; and
   if the inspected actual data amount stored within the image buffer is lower than the second storage threshold, varying the at least one motor driving timing to increase the image data generating rate and to simultaneously decrease a dummy line amount appearing in the image data.

* * * * *